INVENTORS
DONALD S. FRITZ
THOMAS W. MOORE
BY
ATTORNEY

United States Patent Office 3,497,816
Patented Feb. 24, 1970

3,497,816
FREQUENCY SENSOR AND CONTROL CIRCUIT
Donald S. Fritz, Xenia, and Thomas W. Moore, Dayton, Ohio, assignors to American Machine & Foundry Company, a corporation of New Jersey
Continuation of application Ser. No. 466,393, June 23, 1965. This application Apr. 16, 1969, Ser. No. 816,844
Int. Cl. H03k 9/06
U.S. Cl. 328—138        8 Claims

ABSTRACT OF THE DISCLOSURE

Apparatus for detecting and using variations in frequency of an AC signal from a desired value, independent of variations of its voltage level, to provide an output signal representing such frequency variations in which monolithic type capacitors are employed as the main control elements. Operation is accomplished by controlling the discharge of one of the capacitors to provide a timing signal which is combined with the AC signal to develop a null signal when the AC signal is at the desired frequency and a combined signal of predetermined polarity when the AC signal varies from the desired frequency.

---

This invention relates to power monitoring systems and particularly to frequency sensing circuits or sensors used in such systems and to the logic circuits controlled thereby.

In general, the use of inductors or other magnetic frequency determining devices in such circuits is not desirable since they are relatively large and expensive and subject to shifts in resonant frequency due to mechanical presures, impregnation techniques, temperature drifts, etc., while in use.

On the other hand, a frequency sensing circuit utilizing precision resistors and only capacitors as the reactive elements may be formed into a compact and miniaturized assembly having great accuracy and stability in performance. This is particularly true if capacitors of the monolithic variety are used. However, the power handling ratings of such capacitors are relatively small, so that it is necessary to operate them with relatively high impedance control circuits.

It is therefore an object of the invention to provide a frequency sensor in a simple circuit configuration and using components which are stable and reliable in operation and have low weight and small space requirements.

A related object is to provide a stable frequency sensor preferably without the use of transformers or magnetic devices therein.

A more specific object is to provide a stable frequency sensor for use in a power monitoring system in which the frequency determination is independent of variations in voltage level of the AC power source being monitored and is unaffected by generated harmonics of the fundamental wave.

These objects are attained in accordance with the invention by a simple circuit employing a small number of miniaturized capacitors, resistors, and diodes for detecting variations in the frequency of the controlling AC sine wave source from a preset value. The discharge time of one of the capacitors charged by the source during an AC cycle is utilized to produce a voltage at a given point in said circuit indicating the variation of the frequency of said source above or below the preset value, and employing the developed voltage to control the operation of a high impedance indicating device or control logic circuit.

A feature of the invention is the use in this circuit of an input RC filter for effectively reducing the effect of harmonics of the fundamental wave of the alternating current source on the frequency detection and providing sufficient attenuation in the applied wave so that it can be handled by the circuit without the use of a transformer for reducing its voltage.

These and other features and objects of the invention will be brought out in the following detailed description thereof when it is read in conjunction with the figures of the accompanying drawing, in which.

Figure 1:
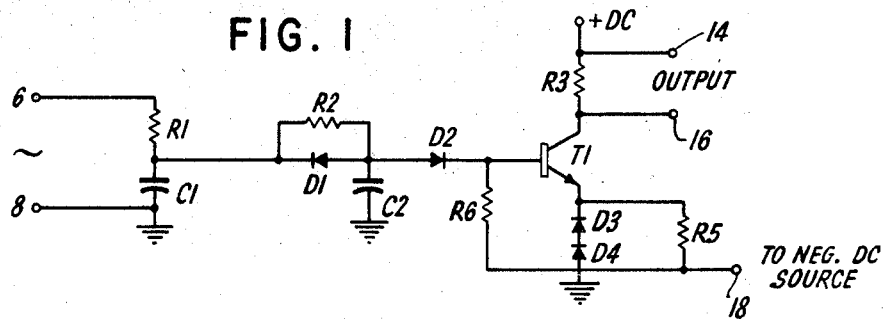
FIG. 1 shows a schematic arrangement of the circuit of a frequency sensor embodying the invention.

The frequency sensor circuit of FIGURE 1 includes an attenuation and filter input circuit, comprising a first resistor R1 and a first capacitor C1 in series therewith having terminals 6, 8 adapted to be connected across an AC signal source, which may be one phase of a 3-phase sine wave power alternator or other source in which changes in frequency from a preset value are to be detected. A second capacitor C2 is connected in series with a second resistor R2 across the capacitor C1 of the input filter. A diode D1 is connected in parallel with resistor R2 and poled in the direction shown. The junction between C2 and the parallel circuit comprising resistor R2 and diode D1 is connected through a second diode D2 to the base of transistor T1 in a signal utilizing circuit. A pair of diodes D3, D4 are connected in series between the emitter of transistor T1 and ground to provide a negative biasing voltage for transistor T1, in conjunction with a resistor R5 which is connected between the emitter and a suitable source of negative DC potential. A resistor R6 is connected between the base of transistor T1 and the negative DC source, to maintain transistor T1 in a non-conducting state until a positive signal is received via diode D2. A load resistor R3 having a pair of output terminals 14, 16 is connected between the emitter of tansistor T1 and a source of positive DC voltage. As will be described in detail, a signal indicating a selected, sensed frequency is developed across terminals 14, 16.

The capacitor C2 is preferably of the monolitchic type, the resistors R1 and R2 of the miniaturized metal-film type, the transistor T1 of the miniaturized type, and the diodes D1 and D2 of the semiconductor type.

Figure 2:
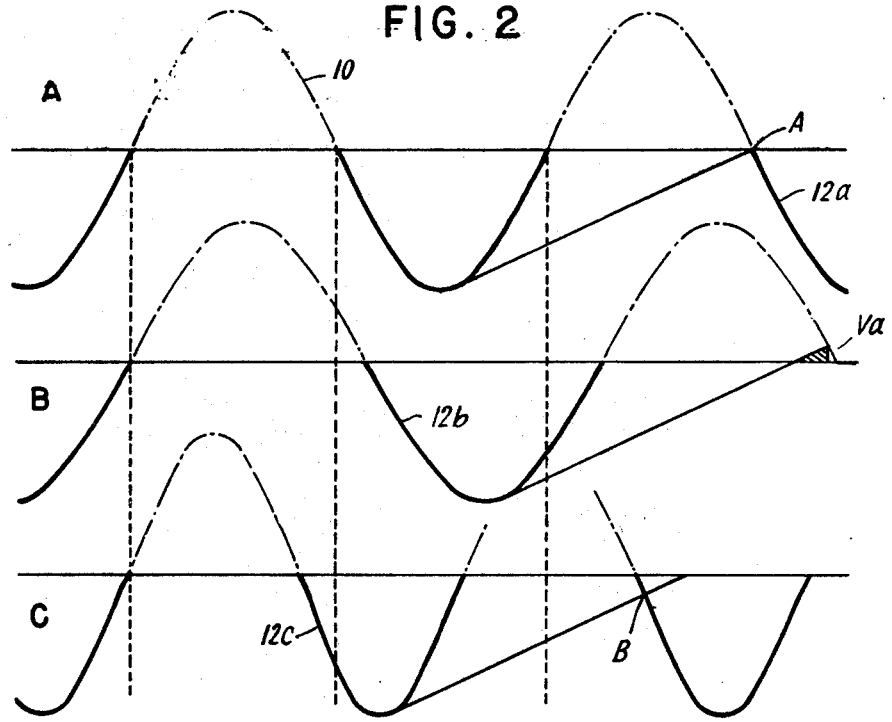
FIG. 2 shows the AC wave forms developed across capacitor C2 for signals of several selected frequencies.

The operation of the frequency sensor circuit of FIG. 1 will now be explained. Referring to FIG. 2, curve A, there is shown a sine waveform 10 of a selected frequency which is representative of the signal appearing across capacitor C1. This signal is rectified by diode D1 which is poled in such a manner that a negative charge is developed in capacitor C2. During the negative half-cycle of sine waveform 10, diode D1 conducts to charge capacitor C2. During the positive half-cycle of sine wave 10, diode D1 is non-conductive so that the magnitude of the positive half-cycle, as seen across the terminals of capacitor C2, is greatly attenuated by resistor R2, which may have a magnitude of 300 kilohms or greater.

The signal wave form appearing across capacitor C2 when the correct frequency is applied across attenuating and filtering input circuit R1, C1 is shown in FIG. 2, curve A, as wave form 12A. After the maximum amplitude of signal 12A is reached during its negative half-cycle excursion, capacitor C2 commences to discharge through resistor R2 and into capacitor C1. The values of capacitor C2 and resistor R2 are so selected that the time constant of the discharge from capacitor C2 is completed at the instant when the wave form of signal 12A has completed its positive half-cycle and passes across the zero axis at point A. At this instant the voltage developed across capacitor C2 is zero.

If the frequency of signal 10 is less than the preset value due to some external cause, the zero charge condition will be reached at an earlier point in the cycle. As shown in FIG. 2, curve B, the signal across capacitor C2, illustrated as lower frequency waveform 12B, will still have a positive value at the instant of zero charge. Accordingly, a positive signal Va will be developed for a short interval of time across C2, as indicated by the cross-hatched section shown on waveform 12B.

On the other hand, if the frequency of signal 10 is greater than the selected value, then the discharge period of capacitor C2 is correspondingly reduced. As shown by waveform 12C of FIG. 2, curve C, the negative half-cycle has commenced before the charge across capacitor C2 is completely dissipated and is equal in magnitude to the charge thereon at point B. The net result in this case is that the charge on C2 is maintained continuously negative.

The diode D2 of FIGURE 1 is poled in the opposite direction to D1 as shown, so that the output of the preceding circuit is recognized by it only when the net signal is positive. The signal then passing through diode D2 can be used to actuate a control device such as a transistor T1, a controlled rectifier or switch, or a following logic circuit which may be used to indicate or correct the frequency of the source. With the particular poling of the diode D2 shown, the device acts as an underfrequency control or limiting indicator. When the frequency of the wave applied to the circuit is a fraction of a cycle lower than the preset value, a signal appears in the output of D2 which can be used to actuate the selected device connected thereto.

The preset value of the correct frequency of the applied signal is a function of the R2, C2 time constant. Since C2 is a capacitor which is not amenable to precise control of value, and for purposes of economy should be chosen in the + or −5 to 10 percent area, R2 must be selected to match the capacitor C2 for the desired frequency. Resistor R2 may then be formed from either a fixed resistor plus an adjustable potentiometer, or from a series or series-parallel group of resistors comprising a main resistor and a first and second vernier, so that standard tolerance resistors can be accommodated to provide an over-all resistance value within a fraction of a percent of a desired value.

As stated, R1 and C1 in series provide an input filter which at the same time produces a desired attenuation of the input circuit voltage, since it is desirable that the sensor operate directly from an 115 volt or other voltage source rather than requiring a separate transformer. By virtue of the very low impedance presented by the capacitor C1 to higher harmonic components in the input signal, the wave form developed across C1 is a relatively clean sinusoid in the presence of a possibly distorted waveform applied to the input terminals 6, 8.

Again referring to FIGURE 1, the emitter of transistor T1 is biased negatively by approximately the voltage drop across a pair of series connected diodes D3, D4. The negative bias corresponding to the forward voltage drop of the two diodes in series compensates for the positive voltage necessary to overcome the diode potential of the emitter-base circuit of T1 along with the diode potential of D2. It is seen then that the transistor T1 is turned On and an output signal will appear across terminals 14, 16 at the instant when the capacitor voltage across C2 becomes positive even to the extent of a few millivolts. The transistor T1 is operated in a high impedance circuit and is preferably of the high-gain variety so that the diode potential is relatively unaffected by the collector current.

Another feature of the circuit of FIG. 1 is that the level of frequency is not affected by the level of voltage of the applied signal 10. Whenever the signal applied to the base of transistor T, is positive, it fires, the first few millivolts being all that is required. If the AC voltage is doubled or cut in half, frequency determination is unaffected, as the circuit has the characteristics of a "null" device.

Figure 3:
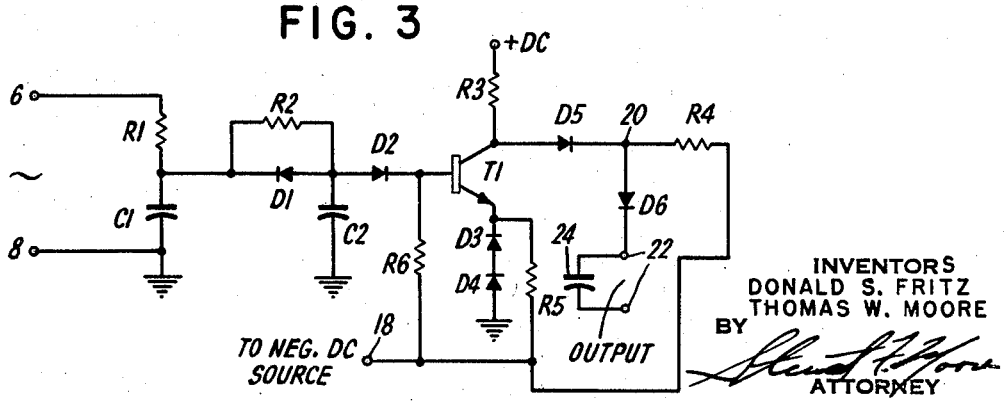
FIG. 3 is a schematic diagram of another embodiment of the invention.

In FIG. 3 there is shown an embodiment of the invention which functions as an over-frequency detector. The circuit components and connections are similar to those shown in FIG. 1, and accordingly where applicable, like reference numerals are used. Additionally however, a diode D5 and a resistor R4 are serially connected between the collector of transistor T1 and a source of negative potential applied to terminal 18. A diode D6 is also connected to a junction point 20 between diode D5 and resistor R4, and to one of output terminals 22. A charging capacitor 24 may also be connected across terminals 22.

The over-frequency embodiment operates in a manner similar to the circuit described in connection with FIG. 1, except that the values of the components are chosen so that when a signal of the frequency selected as normal is applied to terminals 6, 8, transistor T1 is turned On or pulsed once per cycle, causing a low average effective voltage to appear at the collector terminal thereof. The negative potential applied to terminal 18 has a value selected to maintain junction point 20 at an average negative potential while transistor T1 is being pulsed. When the frequency of the input signal increases to the point where capacitor C2 maintains a negative charge throughout the entire cycle, the positive drive for transistor T1 disappears, causing the collector potential to go positive and thus provide a net positive signal through diode D5 and likewise diode D6 to charge capacitor 24 connected across output terminals 22. When the magnitude of the polarized charge developed by capacitor 24 becomes sufficiently great, the charge may be used to actuate an alarm or other control device connected to terminals 22.

The circuits shown in FIGS. 1 and 3 may be assembled into a single packaged unit to thereby provide a frequency sensor which generates a discrete output signal for an over-frequency and under-frequency condition.

While the present invention has been disclosed by means of specific illustrative embodiments thereof, it would be obvious to those skilled in the art that various changes and modifications in the means of operation described or in the apparatus, may be made without departing from the spirit of the invention as defined in the appended claims.

What is claimed is:

1. Frequency sensing apparatus comprising, input means for receiving a sinusoidal input signal having a cycling frequency to be detected, chargeable timing circuit means for developing a timing signal having a selected polarity and a predetermined rate of decay and including means for causing said timing circuit means to charge to and thereby detect the peak value of the input signal during a selected portion of each frequency cycle of said input signal having a polarity the same as said selected polarity of said timing signal and to discharge during the remaining porton of each said cycle, means connected to said timing circuit means for causing the said input signal and the discharge portion of said tilting signal to combine and signal utilizing means connected to said timing circuit means and being responsive to the timing and input signals, whenever the timing signal has a selected magnitude and a resultant polarity opposite to said selected polarity thereof thereby producing an output.

2. The invention defined in claim 1 wherein said input means includes an R.C. network for filtering harmonics from said sinusoidal input signal.

3. The invention defined in claim 1 wherein said means connected between said input and signal utilizing means consists only of a pair of diodes and an R.C. network having a capacitor and a resistor connected in series between said input means and capacitor, one of said pair of diodes being connected in parallel with said resistor and the other of said pair of diodes being connected on one side between said resistor and capacitor and on its other side to said signal utilizing means.

4. The invention defined in claim 1 wherein said input means includes an R.C. filter network for filtering harmonics from said sinusoidal input signal, and said means connected between said input signal utilizing means consists only of a pair of diodes and another R.C. network having a capacitor and a resistor connected in series between said R.C. filter network and capacitor, one of said pair of diodes being connected in parallel with said resistor and the other of said pair of diodes being connected on one side between said resistor and capacitor and on its other side to said signal utilizing means.

5. Frequency sensing apparatus comprising, input means for receiving a sinusoidal input signal having a cycling frequency to be detected, chargeable timing circuit means for developing a timing signal having a predetermined rate of decay and including means for causing said timing circuit means to charge during a first selected portion of each frequency cycle of said input signal and to discharge during the remaining portion of each said cycle for developing the timing signal of a selected polarity and magnitude, and means connected to said timing circuit means for combining said input signal and the discharging portion of said timing signal, and means connected to said timing circuit means and being responsive to the timing and input signals whenever said timing signal of said selected polarity and magnitude is absent for a time duration greater than one cycle.

6. The invention defined in claim 5 wherein said last named means includes an electronic valve connected to said timing circuit means having a capacitor, other means connected to said valve for charging said capacitor, said valve being operative to condition said other charging means to charge said capacitor whenever said timing combined signal of said selected polarity is absent, and means coupled to said capacitor and operative to provide an output signal whenever said charge on said capacitor reaches a predetermined level.

7. Apparatus for sensing variations in the frequency of an A.C. signal from a given preset value comprising input means adapted to receive said signal and including a network of the R.C. type for producing from said signal a sinusoidal wave of the preset frequency substantially free of harmonics, a capacitor, means for rectifying said sinusoidal wave and causing the rectified energy to produce a polarized charge in said capacitor to the peak value of said wave during each cycle thereof, resistance means connected in series between said capacitor and said network for dissipating said charge therein, the product of the capacitance value of said capacitor and the resistance value of said resistance means being such that the charge on said capacitor is substantially dissipated at said preset frequency at the instant in each cycle, when the polarity of the waveform of said sinusoidal wave alternates to a polarity the same as the polarity of the dissipated charge on said capacitor, diode means connected to the junction of said capacitor and said resistance means and operative to conduct when the polarized voltage appearing at said junction has a selected polarity and magnitude, due to the discharged condition of said capacitor occurring earlier in each cycle of said sinusoidal wave; and signal utilizing means connected to said diode and responsive to the signal passed by said diode means to provide an output signal representative of the variation of the A.C. signal from its preselected frequency.

8. Apparatus for sensing the variation of the frequency of a sinusoidal input signal source from a predetermined value comprising, an input circuit including input terminals, a first resistance means and a first capacitor connected in series across said terminals; a second capacitor connected in series with a second resistance means, and a first diode means in parallel with said second resistance means, across said first capacitor; and an output circuit including a second diode means connected to the junction of said second capacitor and said second resistance means, said first diode means being poled to rectify the sinusoidal wave produced at the output of said input circuit and allow the rectified wave energy to produce during each cycle of the wave a charge of a selected polarity and of equal value on said second capacitor which is dissipated in said second resistance means, the product of the capacitance value of said second capacitor and the resistance value of said second capacitor and the resistance value of said second resistance means being such that at the predetermined frequency the charge on said capacitor is substantially dissipated at the instant in each cycle when the sinusoidal waveform alternates to a polarity the same as the polarity of the dissipated charge on said second capacitor, said second diode means being poled so as to be responsive to the voltage appearing at the junction of said second capacitor and said second resistance means at that instant when the frequency of said source varies in a selected direction from said predetermined value at least a fraction of a cycle.

References Cited
UNITED STATES PATENTS 3,099,800   7/1963   Vinson et al. _____ 328—138 X JOHN S. HEYMAN, Primary Examiner U.S. Cl. X.R.

307—233; 328—140